FIG. 1

INVENTOR
WILBUR F. ROPER

Oct. 21, 1969  W. F. ROPER  3,473,368
METHOD AND APPARATUS FOR CONTINUOUSLY MONITORING
PROPERTIES OF THIXOTROPIC FLUIDS
Filed Dec. 27, 1967  6 Sheets-Sheet 2

INVENTOR
WILBUR F. ROPER

Drude Faulconer
ATTORNEY

INVENTOR
WILBUR F. ROPER

United States Patent Office 3,473,368
Patented Oct. 21, 1969

3,473,368
METHOD AND APPARATUS FOR CONTINUOUSLY MONITORING PROPERTIES OF THIXOTROPIC FLUIDS
Wilbur F. Roper, Dallas, Tex., assignor to Mobil Oil Corporation, a corporation of New York
Filed Dec. 27, 1967, Ser. No. 693,866
Int. Cl. G01n 11/04, 15/04
U.S. Cl. 73—55                                            23 Claims

ABSTRACT OF THE DISCLOSURE

A method and apparatus for treating drilling mud. The drill cutting and entrained gas are first removed therefrom and the treated mud is continuously circulated through a holding loop, where the temperature of the mud is stabilized at a desired value. The mud is then taken from the holding loop and the density, flow properties, gel strength, resistivity and pH properties are continuously measured and recorded.

BACKGROUND OF THE INVENTION

In the drilling of wells through earth formations, a fluid commonly called "mud" is normally circulated down through a hollow drill pipe, out openings in a drill bit at the end of the pipe, and back to a storage pit or tank at the surface. This mud, which is usually thixotropic in nature, performs a variety of vital functions in the drilling operation. To perform these functions successfully, the mud must possess certain characteristics or properties which in turn must be quantitatively controlled within desired limits. Among the most important properties of the mud to be controlled are its density, flow properties, gel strength, resistivity, and pH. Since any of these properties can be altered by materials or fluids picked up by the mud as it is circulated through the earth formations, the mud must be carefully monitored upon its return to the surface to determine if, in fact, any of its properties have undergone change and to what extent. If such changes have occurred, adjustments can be made in the composition of the mud to correct its properties to the values now necessary for carrying out its functions under the new conditions being encountered in the well bore.

In some drilling operations, substantial changes in the mud's properties may occur totally unexpectedly and if they are not quickly corrected, disastrous results may follow. For example, if a formation having a high bentonite clay composition is unexpectedly encountered, the mud may pick up bentonite from the formation, thereby substantially increasing the viscosity and gel strength properties of the mud. If this condition is not quickly detected and the composition of the mud changed to compensate for these increased properties, the drill pipe may become "frozen" in the well bore. Therefore, it is extremely desirable to monitor continuously the mud as it is circulated from the well so that any changes in its properties will be detected at the earliest possible moment.

Furthermore, modern drilling processes are becoming more and more automated. In the near future, it is entirely possible that drilling operations will be functional which require only one operator. To accomplish such an operation, the mud system associated therewith must also be automated such that the operator can easily and quickly determine the properties of the drilling mud at any particular time. This requires a continuous monitoring of the mud as it is circulated from the well.

Previously, the most common procedure of monitoring mud consisted of taking several samples from the storage pit and carrying out individual tests for each of the desired properties. For example, one sample of mud was actually weighed or tested with a mud balance to determine density, another sample was flowed through a Marsh Funnel or tested in a Fann V-G Meter to determine viscosity and/or gel strength, and still another sample was tested for pH, etc. This procedure not only is time consuming but also obviously fails to provide the continuous monitoring of mud properties which is necessary in the above-mentioned operations. There have been some apparatuses developed which can be used to monitor continuously certain of the mud's properties, e.g., density and/or viscosity, but these apparatuses are limited and do not provide the complete monitoring capabilities necessary for a fully automated system.

SUMMARY OF THE INVENTION

The present invention relates to a method and apparatus for continuously monitoring a fluid such as drilling mud, said method and apparatus being capable of continuously measuring the density, flow properties, gel strength, resistivity, and pH properties of the fluid. The present method and apparatus provide means by which a single operator can observe the values of the properties of a drilling mud at any particular time. The entire apparatus which comprises an automated monitoring system can be packaged in a relatively small trailer or the like and can be easily transported from one drilling location to another. By including a portable, commercially available power generator, the system can be totally self sustaining and is operable in the remotest of locations.

Specifically, the present invention takes a sample of mud used in a drilling operation and treats same to remove the drill cuttings and entrapped gas therefrom. This treated or "clean" mud is then pumped through a splitter which diverts a part of the mud to a holding loop and the remainder to a sump tank. In the holding loop, the mud is first stabilized at a temperature approximately that at which it leaves the well bore and is then continuously recirculated through the loop. Two pumps are fluidly coupled within the holding loop so that both may pump mud therefrom.

The first or high flow pump takes mud from the holding loop and pumps it through a special viscometer. This viscometer is comprised of a plurality of conduits whose diameters and lengths are determined in accordance with a special design criteria. Mud is flowed at a constant rate through each of the four conduits in series and by means of pressure transducers, the difference in pressure along the length of each conduit is measured. Due to the construction of the viscometer, these measurements are recorded directly as shear stress of the fluid in that particular conduit. These shear stesses, in turn, can readily be translated into flow properties of the fluid, as will be explained in the detailed discussion below.

From the viscometer, the mud normally flows through a commercial pH meter to the sump tank, previously mentioned. While in the pH meter, the pH value of the mud is measured and recorded. When desired, however, the mud may be diverted into a flow calibration chamber where the actual flow rate through the viscometer can be measured.

The second or auxiliary flow pump within the holding loop takes mud therefrom and passes it through a meter where the density of the mud is continuously recorded. The mud flows from the density meter, through a resistivity cell where the mud's resistivity is measured and recorded, and into a gel meter. A bypass in the gel meter allows the bulk of the mud to circulate continuously through the meter while a portion of mud is isolated therein. The isolated portion of the mud is allowed to set in the gel meter for predetermined rest times, at the end of which, the gel strength of the mud for those particular time intervals are recorded. The mud from the gel meter is returned to the holding loop.

Mud from the pH meter may be diverted through a sample tank from which the mud then overflows into the sump tank or the flow may be returned directly to the sump tank. The mud collected in the sample tank is agitated and heated to maintain its uniform properties and temperature. Mud from the sample tank can be pumped when desired through a variable viscometer and back to the sample tank. The variable viscometer is similar to the previously described viscometer except it is comprised of only one conduit through which mud is flowed at varying flow rates. The shear stress values determined by the different flow rates supplement those values obtained from the first viscometer. The actual construction and operation of the viscometers will become clear in the detailed description of the invention which follows. The mud from the variable viscometer can also be diverted into the flow calibration chamber whenever it is desired to measure the actual flow rate through the variable viscometer.

The actual construction, operation, and the apparent advantages of the system and its components will be better understood by referring to the drawings in which like numerals identify like parts and in which:

DESCRIPTION OF THE PREFERRED EMBODIMENT

Figure 1:
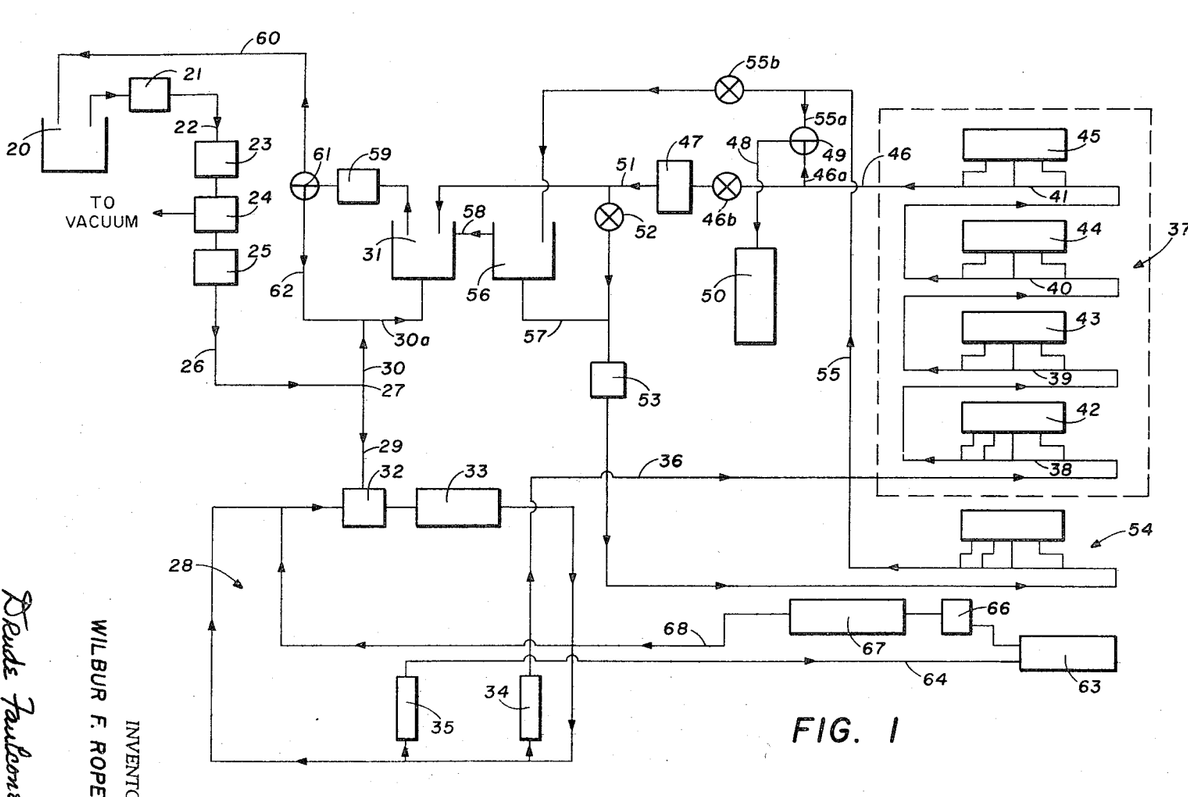
FIGURE 1 is a schematic flow diagram of an automated fluid monitoring system in accordance with the present invention.
Figure 2:
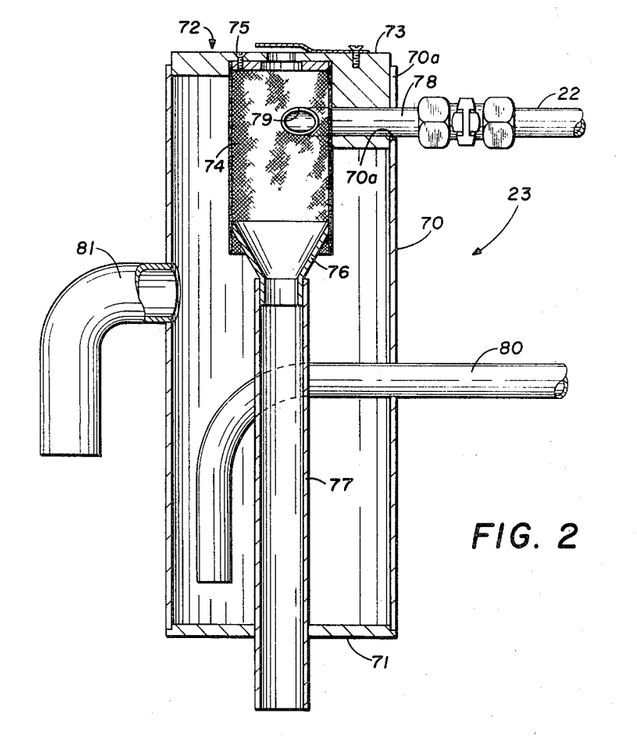
FIGURE 2 is a longitudinal, cross-sectional view of a preferred screen construction to be used in the system of FIGURE 1.

Referring to FIGURE 1, mud which is circulated in a drilling operation is normally stored in a pit or tank 20. Pump 21 picks up mud from pit 20 and pumps it through line 22 into screen 23. The screen cleans the mud by separating out drill cuttings and any other extraneous solid material that may be entrained therein. The excess mud and drill cuttings are returned to pit 20 or otherwise disposed of by a line not shown. Although the construction of the screen is not critical, a preferred embodiment is shown in FIGURE 2 and will be described in detail below. The clean mud from screen 23 is passed through degasser 24 where gas entrained in the mud is removed. The construction of the degasser forms no part of the present invention and can be of any type commonly known in the art, e.g., a vacuum liquid-gas separator. Transfer pump 25 takes the mud from the degasser and pumps it through line 26 into a splitter 27 which may be a simple pipe T. Splitter 27 diverts a portion of the mud through line 29 to holding loop 28 and the remainder through line 30 into sump tank 31.

The mud in loop 28 is continuously circulated therethrough by means of pump 32. Included in loop 28 is heat exchanger means 33 in which the mud is either heated or cooled to a desired temperature, that temperature normally being near the temperature at which the mud exits from the well bore. By stabilizing and maintaining the mud at a desired temperature, any variations in the mud's properties due to temperature changes will be eliminated.

Fluidly connected within holding loop 28 are a first or high flow pump 34 and a second or auxiliary flow pump 35. High flow pump 34 takes a sample of mud from loop 28 and pumps it through line 36 to viscometer 37. The viscometer, as shown in FIGURE 1, is comprised of four sections of conduits 38, 39, 40, 41 in series and their associated valve manifolds 42, 43, 44, 45, respectively. The flow properties of the mud are determined from continuous readings recorded from the viscometer. The actual construction and operation of viscometer 37 will be described separately below.

The mud exiting from viscometer 37 normally passes through line 46 to meter 47 where the pH value of the mud is measured and recorded on a strip chart recorder (not shown) or the like. The actual construction of pH meter 47 forms no part of the present invention but is preferably of the type which generates an electrical potential corresponding to the pH value of the fluid being tested. One such meter is the Model 900 pH Analyzer with a Model 72900 Flow Chamber manufactured and sold by Beckman Instruments, Inc.

Upon leaving meter 47, the mud normally flows through line 51 to sump tank 31. However, by opening valve 52, mud can be diverted through line 57 into sample tank 56 from which it overflows through line 58 into sump tank 31. By closing valve 52 the mud flow is returned to line 51 and directly to the sump tank 31. Sample pump 53 draws mud directly from sample tank 56 through line 57 and pumps it through a second viscometer 54. The second or variable viscometer 54 is comprised of only one section of conduit and relies on varying flow rates to produce different shear stress readings. The speed of pump 53 can be varied to provide the desired flow rates through viscometer 54. The readings obtained from the second viscometer supplement the readings obtained from the first viscometer 37 and provide data for a more complete flow diagram of the mud as will be fully explained in the description of the viscometers below. Mud from viscometer 54 is returned to sample tank 56 by line 55. An agitator (not shown) is usually provided in sample tank 56 to maintain the mud at uniform composition and means (not shown) are provided to keep the mud in sample tank 56 at the desired temperature. Normally, mud is circulated to and from sump tank 31 through lines 62, 30a by means of pump 59. However, if the level in tank 31 rises above a desired height, a float (not shown) in tank 31 actuates control valve 61 to divert flow back to pit 20 through line 60.

Since the flow rates through both viscometers directly affect the readings therefrom, it is necessary to measure accurately these flow rates at desired intervals. To do this, a flow calibration chamber 50 is provided. When the flow through first viscometer 37 is to be measured, three-way valve 49 is set to receive mud from line 46a and motorized valve 46b is closed. This allows the mud to flow through line 48 into chamber 50. The time required to fill a predetermined volume in chamber 50 is recorded. Motorized valve 46b is then reopened to allow the mud to return to its normal path through meter 47. When the flow through second viscometer 54 is to be measured, three-way valve 49 is set to receive mud from line 55a and motorized valve 55b is closed, which allows the mud to flow through line 48 to chamber 50 where it is timed as before. The construction details of chamber 50 and its operation will be more clearly understood from the detailed description set out below.

The second or auxiliary pump 35 is holding loop 28 takes a second sample of mud from loop 28 and pumps it through line 64 to meter 63 where the density of the mud is measured and recorded. A preferred construction of the density meter is set out in detail below. Mud is circulated through density meter 63 into a resistivity cell 66 where the resistivity of the mud is measured and recorded. The construction details of the resistivity cell form no part of the present invention but is preferably one which electrically measures the resistivity of the mud between groups of electrodes. Such cells are well known in the art.

From cell 66, the mud passes to gel meter 67 where a portion of the mud is isolated and allowed to set for predetermined time intervals, at the end of which times the gel strength of the fluid is measured and recorded. A bypass is provided in meter 67 so that mud can continue to pass therethrough even while a portion is isolated therein. The actual construction and operation of gel meter 67 is described in detail below. Mud leaving meter 67 passes back to holding loop 28 where it is recirculated by pump 32. Although not shown for the sake of brevity, the entire monitoring system can be manifolded so that it and all of its components can be flushed with water or solvent and drained in a very short period of time. This is to allow all the mud presently in the system to be removed so that a completely new sample of mud can be monitored when desired.

Also it should be recognized that while the various components of the present invention have been shown coupled together in a particular sequence, different arrangements of components could be followed without departing from the spirit of the present invention. For example, the pH value of the mud could be determined before it reaches viscometer 37 by merely placing meter 47 in front of viscometer 37. Likewise, resistivity cell 66 could be placed before density meter 63 without changing the invention and so on. The following descriptions of the various system components have been divided under appropriate headings for the sake of clarity.

Mud screen

Screen 23 (FIGURE 2) comprises a housing 70 normally closed at one end by plate 71 or the like and having a screen section 72 removably mounted in the other end thereof. Screen section 72 comprises a cap 73 which carries an interchangeable, perforated cylinder 74 by means of screws 75. Perforated cylinder 74 is comprised of screen wire or the like and fits over a funnel means 76 which in turn removably telescopes within stand pipe 77. Pipe 77 passes through and is attached to plate 71. Fixed to cap 73 is an inlet pipe 78 which is coupled to line 22 to transmit fluid from pump 21 to screen 23. Inlet pipe 78 passes through a slot 70a in housing 70 and terminates within an opening 79 in cylinder 74 so that the mud is delivered tangentially into the perforated cylinder near the top. Outlet pipe 80 passes through the wall of housing 70 and provides the means for removing the clean sample of mud from the screen as will be more fully explained below. Overflow pipe 81 also is attached to housing 70 and communicates with an opening therein to remove excess clean mud from the screen.

Operation of the screen is as follows: mud is pumped from pit 20 into screen 23. The mud enters the screen through inlet pipe 78 which is normally constricted near its end so that mud is delivered into the perforated cylinder at a high velocity. This causes the mud to impinge against the inside wall of the perforated cylinder where it falls by gravity toward the bottom of the cylinder. The centrifugal force of the mud against the walls of the perforated cylinder forces the clean mud through the perforations while the larger, solid particles in the mud are screened out and passed downwardly through pipe 77 back to the mud pit. The clean mud which is forced through perforated cylinder 74 will fill housing 70 to a level which allows it to flow through outlet 80 into degasser 24, as previously described. Any excess clean mud that may build up in housing 80 will be removed therefrom by overflow pipe 81.

Viscometers

Viscometer 37 which is used to measure continuously flow properties of the mud is basically a "tube" viscometer. However, it differs therefrom in that it is comprised of four separate "tube" sections coupled together in series to provide a continuous flow path through the viscometer. In each of the four sections the volume flow rate of the mud remains constant. Each section of the viscometer includes a defined length of conduit 38, 39, 40, 41, respectively, with the diameter of each conduit increasing from the smallest conduit 38 to the largest conduit 41. The diameters of the conduits must be chosen so that laminar flow is maintained at all times during the monitoring operation. Therefore, the diameters are critical and depend on the broad viscosity range of the fluid being tested and the flow rate at which it is pumped. A more detailed explanation of this criticality is set out below.

Figure 3:
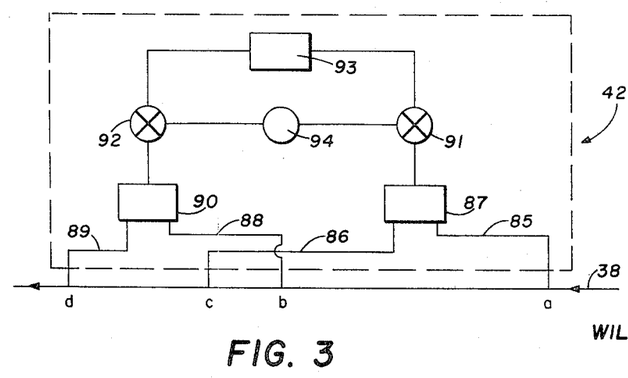
FIGURE 3 is a schematic view of a section of a preferred viscometer to be used in the system of FIGURE 1.

Associated with each conduit 38, 39, 40, 41 is a valve manifold 42, 43, 44, 45, respectively. Since all the sections of the viscometer are similar, only one will be described in detail. Referring more particularly to FIGURE 3, a section of viscometer 37 having a length of conduit 38 is shown schematically. Conduit 38 has a plurality of pressure taps $a$, $b$, $c$, $d$, spaced therein. Taps $a$ and $c$ are connected by lines 85, 86, respectively, to a selector valve 87. Taps $b$ and $d$ are connected by line 88, 89, respectively, to a selector valve 90. Selector valves 87, 90 are connected to shut-off valves 91, 92, respectively, which in turn are connected to a differential pressure transducer of the type which generates a signal corresponding to the difference in pressure between predetermined pressure taps in conduit 38. The signal generated by transducer 93 is continuously recorded by a standard chart recorder (not shown), as is well known in the art. Valves 91, 92 are connected to each other by means of valve 94 so the pressure in the manifold can be equalized when desired. It should be readily apparent that by use of selector valves 87, 90, the actual length of conduit 38 being measured can be changed so separate readings of differential pressure may be recorded for lengths $a$–$b$, $a$–$d$, and $c$–$d$. The desirability of varying the lengths along conduit 38 will become apparent from the following discussion.

Preceding tap $a$ there is an entrance length of conduit equal to at least 100 diameters and having the same inside diameter as the length $a$–$d$. Likewise following tap $d$ there is an exit length of conduit equal to at least 50 diameters and having the same inside diameter as the length $a$–$d$. These entrance and exit lengths assure (as is well known in the art) that the flow in the length $a$–$d$ will be undisturbed by the change in diameters from one conduit to the next.

To understand fully the operation and specific construction of viscometer 37, a brief review of measuring flow properties in a tube viscometer will be beneficial. The pertinent measurable quantities are Q, $\Delta P$, L, and D where the volume flow rate Q produces the differential pressure $\Delta P$ between two pressure taps separated by the length L of the tube with inside diameter D. It has been well established that the flow behavior of the fluid can be represented in terms of the shear stress $p$ at the wall of the tube and the flow function F. The shear stress may be defined as:

$$p = D\Delta P / 4L \qquad (1)$$

and the flow function as:

$$F = 8V/D \qquad (2)$$

where the velocity V of the fluid is given by:

$$V = 4Q/\pi D^2 \qquad (3)$$

An alternate expression for the flow function is then:

$$F = 32Q/\pi D^3 \qquad (4)$$

It is often convenient to plot the viscometric test data as a flow diagram with shear stress ($D\Delta P/4L$) as the ordinate and the flow function ($8V/D$) as the abscissa. In the absence of time effects and anomalous wall effects, the data points in such a flow diagram are found to represent a single curve which, for laminar flow, is independent of the geometry of the viscometer. The shape of the curve depends upon the flow properties of the fluid. It is often possible to represent the curve by a relatively simple mathematical expression relating the shear stress and the flow function with the flow properties as constants in the equation. The values for the flow properties can then be deduced either from the flow diagram or directly from the viscometer data through the use of the appropriate mathematical expressions.

From Equation 1 it can be seen that in determining shear stress of a fluid through a tube whose diameter and length are known, only $\Delta P$ across the tube needs to be measured. This value is directly measured by the differential pressure transducer in each section of viscometer 37 and recorded on a strip chart. To make the $\Delta P$ readings more meaningful in an automated system, viscometer 37 is designed so that the $\Delta P$ reading for each conduit will be recorded directly as shear stress of the fluid through that particular conduit. This is done by establishing the following relationship between each section of viscometer 37:

$$\frac{D_{38}}{L_{38}} = \frac{D_{39}}{L_{39}} = \frac{D_{40}}{L_{40}} = \frac{D_{41}}{L_{41}} \qquad (5)$$

where:
D is the diameter and L is the length of the conduits 38, 39, 40, 41, as the subscripts indicate.

The purpose of varying the lengths of a particular conduit in viscometer 37 by means of selector valves 87, 90, (FIGURE 3) is to allow a single, standard recorder to be used for several different fluids having a wide range of viscosities. For example, the shear stress ($\Delta P$) of fluids having a relatively common viscosity would be measured across the length $a-b$. The recorder chart is calibrated to give an actual or one-to-one reading for this length. However, if a fluid having an extremely low viscosity is measured along the same length, the readings may fall below the ranges on the charts and the separation between readings for each conduit would be poor. Therefore, for low viscosity fluids, selector valves 87, 90 are positioned to record shear stress ($\Delta P$) across length $a-d$ (twice and the length $a-b$). This provides a two-to-one shear stress reading and allows all the readings to remain on the chart. The chart readings are merely divided by two to obtain the actual values of shear stress. If a fluid having an extremely high viscosity is being monitored, selector valves 87, 90 are positioned so that the shear stress ($\Delta P$) is measured across length $c-d$ (one-half length $a-b$). The chart reading will be only one half the actual shear stress values but can be converted to the actual values by merely multiplying by two.

A typical example of an actual viscometer constructed in accordance with above-described criteria is set out in the table below. The diameters of the conduits were selected to insure that laminar flow would be maintained for predetermined flow rates and that a distinguishable $\Delta P$ would occur in each conduit. Using these selected diameters and the relationship of Equation 5 above, the lengths of each conduit were determined. These conduits were checked with a fluid of known viscosity at a known flow rate of 0.725 gallon per minute to insure that the $\Delta P$ readings for each conduit fell within the range of the selected recorder. The dimensions are as follows:

| Conduit | Internal Diameter (D), Inches | $D_3$,* Cubic Inches | Flow Function Value 8V/D, Sec.$^{-1}$ | Range of $\Delta P$, Inches of Water Column | Length (Inches) a-b | a-d | c-d |
| --- | --- | --- | --- | --- | --- | --- | --- |
| 38 | 0.3096 | 0.02968 | 957.6 | 0-50 | 20.133 | 40.266 | 10.066 |
| 39 | 0.3871 | 0.0580 | 490.2 | 0-50 | 25.173 | 50.346 | (**) |
| 40 | 0.511 | 0.1334 | 213.1 | 0-50 | 33.220 | 66.440 | (**) |
| 41 | 0.620 | 0.2383 | 119.3 | 0-50 | 40.320 | 80.640 | (**) |

* The ratio of the cubes of the diameters of adjacent conduits approximates 2. That is:

$$\left(\frac{D_{39}}{D_{38}}\right)^3 \approx 2; \quad \left(\frac{D_{40}}{D_{39}}\right)^3 \approx 2; \quad \left(\frac{D_{41}}{D_{40}}\right)^3 \approx 2$$

**It was found that length c-d was not needed for larger diameter conduits.

Figure 4:
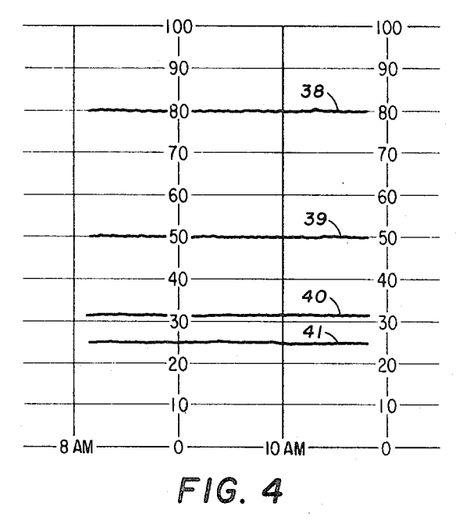
FIGURE 4 is a perspective view of a portion of a strip chart on which readings from the viscometer of FIGURE 3 are recorded.

Now from Equation 1 it should be readily apparent that $D/4L$ will be equal for all four sections of conduit. By design, the actual numerical value of this constant can be determined and the pressure transducer can be calibrated so that the $\Delta P$ readings are recorded on the strip chart to read directly in units of shear stress; see FIGURE 4 which shows typical shear stress readings on a four-pen recorder chart.

Figure 5:
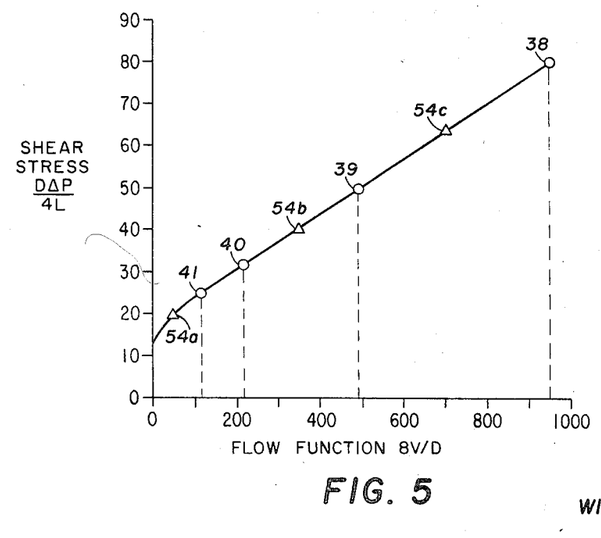
FIGURE 5 is a flow diagram of a viscosity curve of a fluid tested in the viscometer of FIGURE 3.

Also, since the volume flow rate Q is constant for all four sections of viscometer 37 and the diameter D of each conduit is known, the velocity V of the fluid through the conduit can be determined from Equation 3. Knowing V, the flow function value for each conduit can be determined from Equation 2. Since both V and D are constant for each conduit, the flow function value for that particular conduit will also be constant for any fluid flowed through that conduit at the set volume flow rate. Therefore, the flow diagram of a fluid can be continuously maintained (FIGURE 5) by plotting the shear stress ($\Delta P$) readings from the recorder (FIGURE 4) against the predetermined known flow function for each conduit.

The viscometer having the above dimensions is capable of accurately monitoring drilling fluid having a plastic viscosity in the range of 4 to 80 centipoises and a yield strength of from 2 to 40 pounds per 100 square feet. This range includes most common drilling muds.

The viscometer 54 is comprised of only one section which is identical in construction to the section of viscometer 37 shown in FIGURE 3. The difference between the two varies only in the manner in which they operate. In viscometer 54, the flow rate is varied by means of pump 53 and the shear stress and flow function value are determined for each flow rate. Once again, the $\Delta P$ reading is recorded directly as shear stress since $D/4L$ (see Equation 1 above) for viscometer 54 is obviously a constant. However, flow function $8V/D$ changes for each flow rate as given by Equation 4. Since $D^3$ is determined by the tube diameter which does not change, $32\pi/D^3$ becomes a constant ($k$). It follows that for a particular tube, the nominal shear rate can be written as $kQ$. In the present invention, flow rate Q is measured by calibration chamber 50, the details of which are set out below. Chamber 50 measures the time T which is required to fill a predetermined volume Z. Since the flow rate Q equals the predeaermined volume Z divided by time T, flow function $kQ$ becomes $k(Z/T)$ and since Z is constant for all flow rates, the shear rate equation becomes $K/T$ for a particular diameter tube where K is a constant $kZ$. Therefore, by merely recording the time from the calibration chamber 50, the flow function value can be measured. The points 54$a$, 54$b$, 54$c$, etc., obtained from various flow rates through viscometer 54 can be plotted on the graph of FIGURE 5 to establish more completely the flow diagram of the monitored fluid.

Flow calibration chamber

Figure 6:
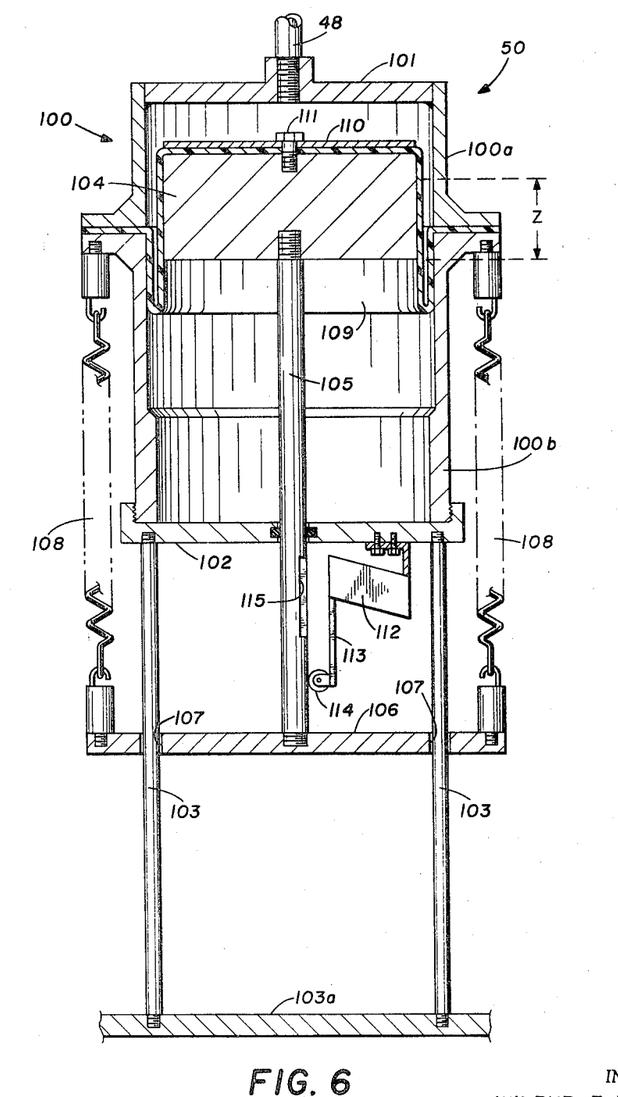
FIGURE 6 is a longitudinal, cross-sectional view of a flow calibration device to be used in the system of FIGURE 1.

A preferred construction of the flow calibration chamber is shown in FIGURE 6. Flow calibration chamber 50 is comprised of a housing 100 which in turn is comprised of two parts 100$a$ and 100$b$ joined together by screws or the like (not shown). The upper end of the housing is closed by a plate 101 which has an opening therethrough to which inlet pipe 48 is connected. The lower end of housing 100 is closed by a cap 102. Guide numbers 103 are fixedly secured at one of their ends to cap 102 and at the other of their ends to base member 103$a$. Slidably mounted in the housing 100 is a piston 104 which has a piston rod 105 fixedly attached thereto. Piston rod 105 slidably passes through an opening in cap 102 and is fixedly connected at its lower end to cross member 106. Cross member 106 has openings 107 therethrough whereby cross member 106 can be slidably mounted on guide members 103. Springs 108 are connected at their one end to housing part 100$b$ and at their other ends to cross member 106, for a purpose described below. A rolling seal means 109, such as a commercially available Bellofram, is affixed to housing 100 between the parts 100$a$ and 100$b$ and is also attached to piston 104 by means of plate 110 and screw 111, as clearly shown in FIGURE 6. Microswitch 112 is attached to cap 102 and has a flexible arm 113 which carries a roller 114. Piston rod 105 has a slot 115 cut along a portion thereof for a purpose explained below.

The operation of flow calibration chamber 50 is as follows. When it is desired to measure the actual flow rate through viscometer 37, motorized valve 46$b$ is closed to divert flow through line 48 into chamber 50. The mud as it flows into housing 100 will force piston 104 and piston rod 105 downward against the bias of the springs 108. As piston rod 105 moves downward, roller 114 of microswitch 112 will fall into slot 115 on rod 105. This movement of microswitch 112 starts a timer (not shown). The timer will continue to run until the up end of slot 115 is reached at which time roller 114 will be forced out of the slot, thereby stopping the timer. Also at this point, microswitch 112 will automatically open motorized valve 46$b$ so that springs 108 will force the piston upward to thereby push the mud in housing 100 back through line 48 and will allow the flow of mud through line 46 to continue on to pH meter 47 (see FIGURE 1). The length of slot 115 corresponds to a known volume Z in the housing so that the timer will run only during the time required to fill the volume Z. When it is desired to measure the flow rate through viscometer 54, the same procedure is followed except motorized valve 55$b$ is closed instead of valve 46$b$. Since the chamber automatically "dumps" itself at the end of the time required to fill volume Z, the chamber is always ready to measure the next flow rate.

Density meter

Density meter 63 can be of any type which will continuously monitor the density of the mud. However, a preferred construction of the meter is disclosed in FIGURES 7 and 7A. Density meter 63 is comprised of a housing 120 having an inlet pipe 121 and an outlet pipe 122. Both inlet and outlet pipes are held in a fixed relationship to housing 120 by means of braces 123 and 124, respectively. A U-shaped tube 127 of known volume has one end thereof coupled to inlet pipe 121 and its other end coupled to outlet pipe 122 by means of flexible couplings 125 and 126, respectively. Frame 128 comprised of elongated members 129, 130, is centrally secured to and carried by the U-tube 127 by means of cross members 131, 132, 133. Secured to the free end of frame 128 is a screw 134 on which an adjustable counterweight 135 is threaded. Cross member 133 carries a lever arm 136 on which is mounted a core 137 of a linear variable differential transformer. Core 137 is slidably mounted in the coil 138 of the transformer which in turn is fixedly secured to housing 120 by support member 139. Spring 141 is attached at its one end to support 139 and at its other end to cross member 132 of the U-tube. A fluid-filled, dash pot 142 is positioned between the housing 120 and the cross member 132 on the U-tube to dampen out movement of the U-tube due to strenuous vibrations and other disturbances. Support 144 is affixed to housing 100 and extends upward between elongated members 129, 130. Support 144 supports frame 128 and U-tube 127 by means of pivot pins 144$a$ which allow tube 127 to move relative to inlet 121 and outlet 122. A spirt-filled circular level 145 is mounted on support member 144 so that the entire density meter can be leveled in a horizontal position.

Figure 7:
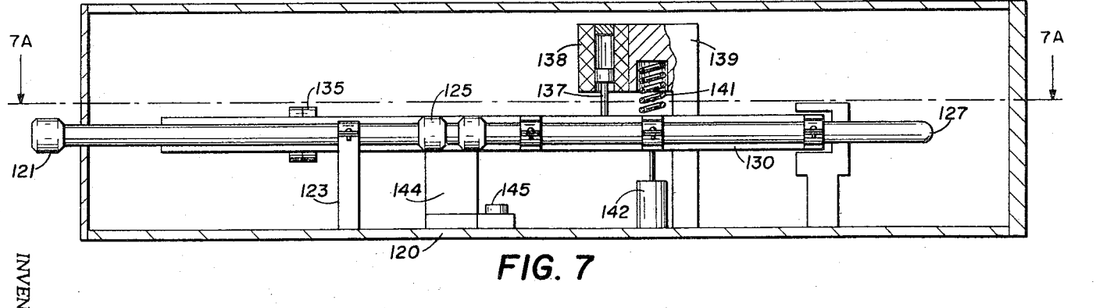
FIGURE 7 is an elevational view, partly in section, of a preferred construction of a density meter to be used in the system of FIGURE 1.
Figure 7A:
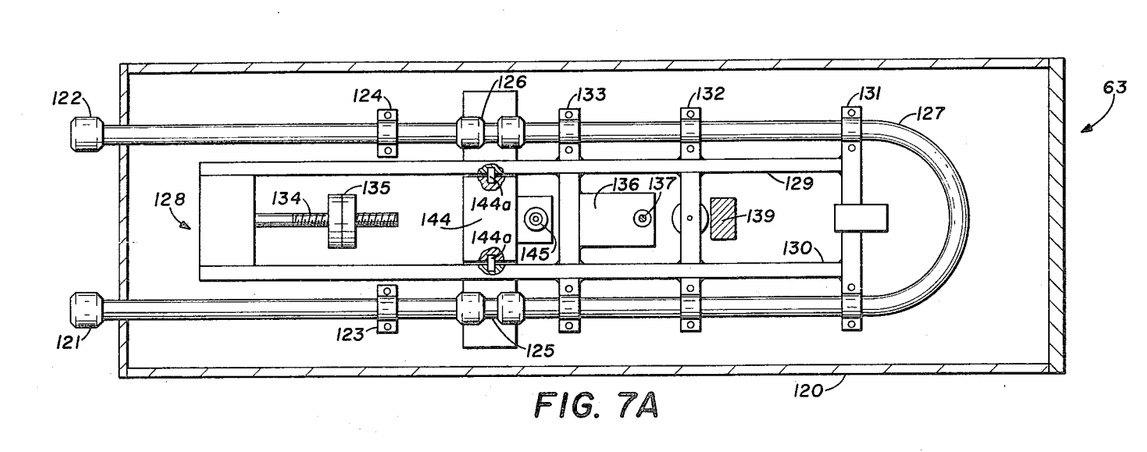
FIGURE 7A is a plan view of the density meter taken along section 7A—7A of FIGURE 7.

The operation of meter 63 is as follows: after the meter is leveled, mud is flowed through inlet pipe 121 to fill tube 127. The counterweight 135 is adjusted to balance the mud-filled tube 127 so that the output signal equals the density of the mud. Any change in the density of the mud flowing through the U-tube will extend or contract spring 141 in proportion to the change and will cause the U-tube to move upward or downward about pins 144$a$. The very small movement of U-tube 127 and supporting structure 128 also moves the core of the variable differential transformer and causes a change in the output of coil 138. The output of coil 138 goes to a standard recorder which is calibrated to read the density directly.

Gel meter

As briefly stated above, most drilling fluids are thixotropic in nature which means that the fluid has a tendency to become a semisolid gel when left undisturbed for a time. This gel or jellylike mass will usually disintegrate when the fluid is agitated. Gel strength is a valuable property of a drilling mud since it prevents drill cuttings from settling out in the event circulation through the well is interrupted. Gel strength of a fluid may be more simply defined as the shear stress required to initiate flow after the fluid has been at rest without stress for a specified period of time.

Figure 8:
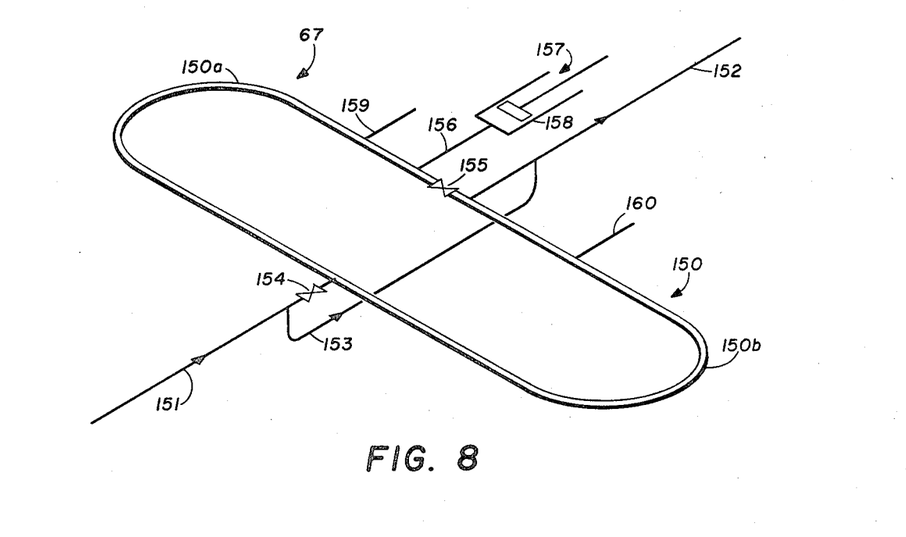
FIGURE 8 is a schematic view of a preferred construction of a gel meter to be used in the system of FIGURE 1.

A preferred type of instrument for continuously monitoring the gel strength of a drilling mud is shown schematically in FIGURE 8. Gel meter 67 comprises a looped tube 150 having two identical halves 150$a$, 150$b$. Tube 150 has an inlet conduit 151 and an outlet conduit 152 fluidly coupled thereto. A bypass conduit 153 connects inlet conduit 151 directly to outlet conduit 152 so that flow may bypass tube 150 when desired. A first valve 154 is positioned in inlet conduit 151 on the downstream side of the entrance of bypass 153 and a second valve 155 is positioned in looped tube 150 adjacent the outlet conduit 152. Valves 154 and 155 are mechanically coupled (not shown) so that both can be opened or both can be closed simultaneously. Fluidly coupled to looped tube 150 by means of line 156 is a positive displacement pump 157. The construction details of this pump are not shown and can be of any type that pumps fluid at a low, uniform rate. Preferably, the pump is a single stroke piston pump which is driven forward at a constant speed by a calibrated, motor-driven feed screw. Pressure taps 159, 160 are provided in loop halves 150$a$, 150$b$, respectively, which are connected to a standard differential pressure transducer (not shown).

The operation of gel meter 67 is as follows. Normally, the mud being monitored is pumped through inlet conduit 151, bypass 153, and out outlet 152 and back to holding loop 28 (FIGURE 1). When it is desired to test the gel strength, valves 154, 155 are opened and mud enters looped tube 150 in such a way that it splits into equal parts with one part filling half 150a and the other part filling half 150b. The parts recombine to flow through outlet conduit 152. The distances around halves 150a, 150b to pressure taps 159, 160, respectively, are made equal so the differential pressure during the filling operation is zero. During filling, the piston 158 in pump 157 is uniformally withdrawn so the pump is also filled with mud. After the meter is completely filled, valves 154, 155 are closed and the mud isolated in looped tube 150 is allowed to set for a predetermined time. The gel strength developed by a mud usually increases as the rest time increases. It is therefore customary to specify the rest time associated with a particular value of the gel strength, as, for example, 10 second gel strength, 10 minute gel strength, etc. Initial gel strength means a rest time as near zero as possible.

At the end of the desired rest time, the mud in looped tube 150 is caused to flow by means of pump 157. Since valves 154, 155 are closed, the flow path is from pump 157, past pressure tap 159, around tube 150, past pressure tap 160, and through outlet conduit 152. As flow is initiated, the pressure difference $\Delta P$ between taps 159 and 160 will rise rapidly to a peak value and then will usually decrease somewhat less rapidly as flow continues. The peak of the recorded $\Delta P$ is directly proportional to gel strength of the fluid at that particular rest time.

Figure 9:
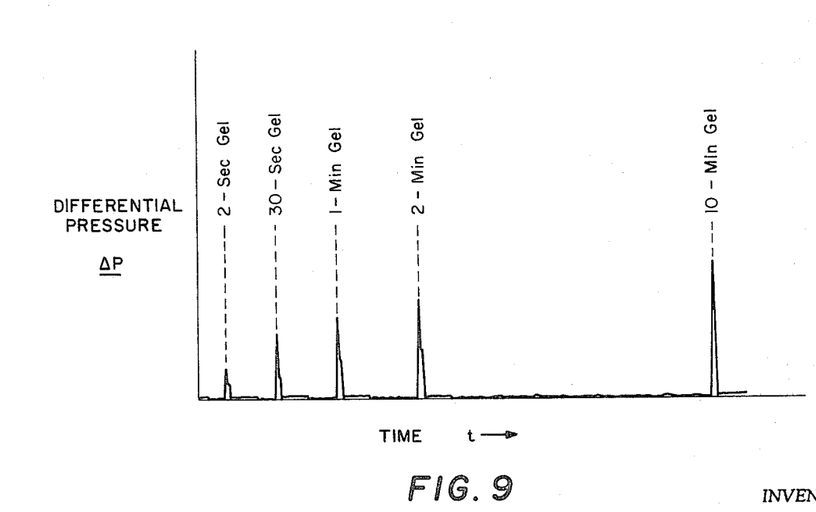
FIGURE 9 is a portion of a strip chart showing typical readings obtained from the gel meter of FIGURE 8.

At the end of a test, valves 154, 155 are opened and a portion of the mud is again diverted from bypass 153 through looped tube 150 to flush the remaining sampled mud therefrom. After flushing, the tube 150 and pump 157 are allowed to refill with mud and a second test is performed. Normally this test is at a different rest time than the first test. This procedure can be repeated as many times as desired. FIGURE 9 discloses a strip chart from a standard pen recorder showing typical $\Delta P$ readings for two-second, thirty-second, one-minute, two-minute, and ten-minute gel strength tests of a drilling fluid.

It is highly desirable, though not necessary, that the values of gel strength obtained by meter 67 be approximately equal to those obtained from other commonly used gel meters, e.g., a Fann V-G Meter. This can be done by using a preferred flow rate during the actual gel strength measurements. Experimentally, it was found that this flow rate through tube 150 should be such that eight times the linear velocity divided by the inside diameter of tube 150 is greater than one but less than five $$\left(1 < \frac{8V}{D} < 5\right)$$

and preferably about two $$\left(\frac{8V}{D} \approx 2\right)$$

The speed of pump 157 can be calibrated to displace mud at this desired relationship.

While a particular embodiment of the method and apparatus for continuously monitoring the properties of a thixotropic fluid has been illustrated and described, it will be obvious that changes and modifications can be made without departing from the spirit of the invention.

What is claimed is:

1. An automated system for continuously monitoring the properties of a thixotropic fluid comprising:
   means for removing extraneous solid particles from said fluid;
   means for removing entrained gas from said fluid;
   a holding loop adapted to receive said fluid after the solid particles and gas have been removed;
   means in said holding loop to circulate said fluid through said holding loop;
   means in said holding loop for adjusting the temperature of said fluid to a stabilized value;
   a constant flow rate viscometer means fluidly coupled to said holding loop for continuously measuring the flow properties of said fluid including means to supply fluid from said loop to said viscometer means at a constant flow rate;
   a variable flow rate viscometer means fluidly coupled to said holding loop also for continuously measuring the flow properties of said fluid including means to supply fluid to said variable viscometer means at varying flow rates;
   means fluidly coupled to said holding loop for continuously measuring the density of said fluid;
   means fluidly coupled to said holding loop for continuously measuring the gel strength of the fluid;
   means fluidly coupled to said holding loop for continuously measuring the resistivity value of the fluid; and
   means fluidly coupled to said holding loop for continuously measuring the pH value of the fluid.

2. The system of claim 1 including: means fluidly coupled to both said constant flow rate viscometer and said variable flow rate viscometer for alternately measuring the volume flow rate through each of said viscometers.

3. The system of claim 1 wherein said constant flow rate viscometer means comprises:
   a plurality of conduits joined together to form a continuous flow path through said viscometer means;
      each of said conduits having a known diameter (D) and length (L) different from the respective diameters and lengths of the other of said conduits, the ratio $D/L$ of each conduit being equal to the ratio of $D/L$ of the other respective conduits; and
   means for measuring the difference in pressure across the length of each of said conduits.

4. The system of claim 1 wherein said means for continuously measuring the gel strength of said fluid comprises:
   tube means having two identical halves joined together to form a continuous looped tube;
   inlet means fluidly coupled to said tube means at one of the points where said two halves meet;
   outlet means fluidly coupled to said tube means at the other of the points where said two halves meet;
   valve means for isolating fluid in said looped tube for a predetermined time;
   means in said tube means for measuring the difference in pressure between two points in said looped tube; and
   means to induce flow in said tube means at a predetermined rate at the end of said predetermined time.

5. The system of claim 4 wherein said means for measuring the difference in pressure in said gel strength measuring means comprises:
   two pressure taps in said tube means,
      one of said taps being positioned in one of said halves of said tube means at a set distance from said inlet means,
      the other of said taps being positioned in the other of said halves of said tube means at the same set distances from said inlet means as said one of said taps is positioned from said inlet means; and
   means connected to both of said pressure taps to measure the difference in pressure between the two taps.

6. An automated system for continuously monitoring the properties of a thixotropic fluid comprising:
   a holding loop adapted to receive said fluid;
   means in said holding loop to circulate said fluid through said holding loop;

means in said holding loop for adjusting the temperature of said fluid to a stabilized value; and means fluidly coupled to said holding loop for continuously measuring the flow properties of said fluid.

7. The system of claim 6 including: means fluidly coupled to said holding loop for continuously measuring the density of said fluid.

8. The system of claim 6 including: means fluidly coupled to said holding loop for continuously measuring the pH value of the fluid.

9. The system of claim 6 including: means fluidly coupled to said holding loop for continuously measuring the resistivity value of said fluid.

10. The system of claim 6 including: means for removing extraneous solid particles from said fluid prior to said fluid being received by said holding loop.

11. The system of claim 6 including: means fluidly coupled to said holding loop for measuring the volume flow rate of said fluid through said system.

12. The system of claim 6 wherein said means for continuously measuring the flow properties of said fluid comprises:

a plurality of conduits joined to form a continuous flow path for said fluid,
each of said conduits having a known diameter (D) and length (L) different from the respective diameters and lengths of the other of said conduits, the ratio of $D/L$ of each conduit being equal to the ratio of $D/L$ of the other respective conduits;

means for measuring the difference in pressure across the length of each of said conduits; and means in said system for flowing said fluid through each of said conduits at the same, constant volume flow rate.

13. The system of claim 6 including: means fluidly coupled to said holding loop for continuously measuring the gel strength of said fluid.

14. The system of claim 8 wherein said means for continuously measuring the gel strength of said fluid comprises:

tube means having two identical halves joined together to form a continuous looped tube;

inlet means fluidly coupled to said tube means at one of the points where said two halves meet;

outlet means fluidly coupled to said tube means at the other of the points where said two halves meet;

valve means for isolating fluid in said looped tube for a predetermined time;

means in said tube means for measuring the difference in pressure between two points in said looped tube; and means to induce flow in said tube means at a predetermined rate at the end of said predetermined time.

15. The system of claim 14 wherein said means for measuring the difference in pressure in said gel strength measuring means comprises:

two pressure taps in said tube means,
one of said taps being positioned in one of said halves of said tube means at a set distance from said inlet means,
the other of said taps being positioned in the other of said halves of said tube means at the same set distance from said inlet means as said one of said taps is positioned from said inlet means; and means connected to both of said pressure taps to measure the difference in pressure between the two taps.

16. In an automated system for continuously monitoring the properties of a thixotropic fluid, a means for measuring the flow properties of said fluid comprising:

a plurality of conduits joined to form a continuous flow path for said fluid,
each of said conduits having a known diameter (D) and length (L) different from the respective diameters and lengths of the other of said conduits,
the ratio of $D/L$ of each of each conduit being equal to the ratio of $D/L$ of the other respective conduits;

means for measuring the difference in pressure across the length of each of said conduits; and means for flowing said fluid through each of said conduits at the same, constant volume flow rate.

17. In an automated system for continuously monitoring the properties of a thixotropic fluid, a means for measuring the gel strength of said fluid comprising:

tube means having two identical paths joined together to form a continuous looped tube;

inlet means fluidly coupled to said tube means at one of the points where said two halves meet;

outlet means fluidly coupled to said tube means at the other of the points where two halves meet;

valve means for isolating fluid in said looped tube for a predetermined time;

means in said tube means for measuring the difference in pressure between two points in said looped tube; and means to induce flow in said tube means at a predetermined rate at the end of said predetermined time.

18. Means for measuring gel strength as set forth in claim 17 wherein said means for measuring the difference in pressure comprises:

two pressure taps in said tube means,
one of said taps being positioned in one of said halves of said tube means at a set distance in said inlet means,
the other of said taps being positioned in the other of said halves of said tube means at the same set distances from said inlet means as said one of said taps is positioned from said inlet means; and means connected to both of said pressure taps to measure the difference in pressure between the two taps.

19. Means for measuring gel strength as set forth in claim 18 including: bypass means fluidly coupling said inlet means directly to said outlet means so that said fluid can bypass said looped tube.

20. A method of continuously monitoring the properties of a thixotropic fluid comprising:

continuously circulating said fluid through a holding and monitoring system, adjusting the temperature of said fluid to a stabilized value; and continuously measuring the density, viscosity, gel strength, resistivity, and pH properties of the fluid after it has reached said stabilized value and as it is being circulated through said monitoring system.

21. The method of claim 20 including: treating said fluid to remove extraneous solid particles and gas therefrom prior to adjusting the temperature thereof.

22. A method of continuously monitoring the properties of a thixotropic fluid which is normally circulated in the drilling of a well through earth formations comprising:

taking a sample of the fluid as it is returned from said well and treating same to remove gas entrained therein and extraneous solid particles such as drill cuttings therefrom;

continuously circulating said treated fluid through a holding and monitoring system;

adjusting the temperature of said treated fluid to a stabilized value; and continuously measuring the density, viscosity, gel strength, resistivity, and pH properties of the fluid after it has reached said stabilized value and as it is being circulated through said monitoring system.

23. The method of claim 22 wherein: said stabilized value approximates the temperature at which said fluid leaves said well.

References Cited

UNITED STATES PATENTS

| | | | |
|---|---|---|---|
| 2,987,923 | 6/1961 | Hoeppel et al. | 73—54 XR |
| 3,116,630 | 1/1964 | Piros | 73—55 |
| 3,286,510 | 11/1966 | Parker | 73—61.4 |
| 3,334,513 | 8/1967 | Thomas | 73—55 XR |
| 3,375,704 | 4/1968 | Thompson et al. | 73—55 |
| 3,411,342 | 11/1968 | Liermann | 73—53 |

LOUIS R. PRINCE, Primary Examiner

HARRY C. POST III, Assistant Examiner

U.S. Cl. X.R.

73—32, 61.4, 64.1, 151

UNITED STATES PATENT OFFICE

CERTIFICATE OF CORRECTION

Patent No. 3,473,368                                      October 21, 1969

Wilbur F. Roper

It is certified that error appears in the above identified patent and that said Letters Patent are hereby corrected as shown below:

Column 1, line 26, "through" should be cancelled. Column 5, line 3, "is" should read -- in --. Column 6, line 5, "80" should read -- 70 --. Column 8, in the table, heading to the third column, "$D_3$," should read -- $D^3$, --. Column 9, line 2, "predeaermined" should read -- predetermined --. Column 10, line 23, "spirt" should read -- spirit --. Column 12, line 65, "distances" should read -- distance --. Column 13, line 39, "8" should read -- 13 --. Column 14, line 5, cancel "of each", second occurrence.

Signed and sealed this 28th day of April 1970.

(SEAL)

Attest:

Edward M. Fletcher, Jr.

Attesting Officer

WILLIAM E. SCHUYLER, JR.

Commissioner of Patents